June 16, 1964  F. A. SCHICK  3,137,376
MEANS FOR COUPLING TRANSMISSION GEARS
Filed June 1, 1962

Inventor
Frederick A. Schick
By Charles L. Schwab
Attorney

United States Patent Office 3,137,376
Patented June 16, 1964

3,137,376
MEANS FOR COUPLING TRANSMISSION GEARS
Frederick A. Schick, Springfield, Ill., assignor to Allis-Chalmers Manufacturing Company, Milwaukee, Wis.
Filed June 1, 1962, Ser. No. 199,441
2 Claims. (Cl. 192—67)

This invention relates to clutch mechanism for selectively coupling gears of a constant mesh transmission to the transmission shaft on which supported.

In constant mesh transmissions it has heretofore been a common practice to provide an internally splined clutch collar on an externally splined shaft hub disposed between axially spaced gears. In this type of gearing, the shiftable clutch collar is moved axially to slidingly engage its spline teeth with spur teeth on the gears, thereby selectively establishing a driving relation between the shaft and the gears. Heretofore considerable difficulty has been experienced in keeping the clutch collar in its axially shifted coupling positions. In some instances the force required to maintain the coupling relationship has been sufficiently great to cause excessive wearing of the shifter yoke and collar. Such wear may prevent full coupling engagement, thereby causing excessive stressing of the engaged portions of the partially engaged coupling teeth. Excessive stressing results in premature failure of parts as is well understood by those familiar with the gearing art.

Various tapered teeth arrangements have heretofore been suggested to remedy the problem of excessive force requirements to maintain the clutch collar in its coupling positions. However, such arrangements have not been entirely satisfactory either in view of their requiring an excessive amount of axial space or in view of the excessive expense of machining components or both.

It is an object of this invention to provide a clutch mechanism for a constant mesh transmission which remedies the hereinbefore mentioned difficulties in an entirely satisfactory manner and satisfies the requirements of minimum axial space and economy of manufacture.

It is a further object of this invention to provide a clutch mechanism of the shiftable collar type wherein tapered collar teeth and mating tapered hub teeth cooperate to releasably maintain the collar in its coupling positions.

It is a further object of this invention to provide abutment means on the gears and the collar of the hereinbefore described clutch mechanism which are independent of the collar spline teeth, for limiting axial movement of the collar in axially opposite directions.

These and other objects and advantages of this invention will be apparent when the following description is read in conjunction with the drawings in which.

Figure 1:
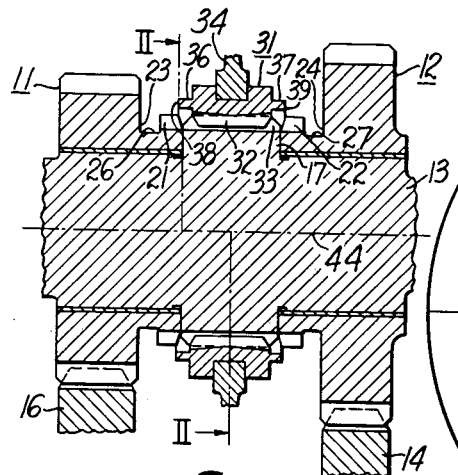
FIG. 1 is a section of a portion of a constant mesh transmission in which the present invention is incorporated.
Figure 5:
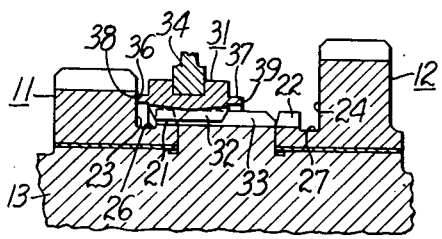
FIG. 5 is a section similar to FIG. 1 but showing the clutch collar in a coupling position.

Referring to FIG. 1, a pair of coaxial gears 11, 12 are rotatably mounted on a shaft 13 in axially spaced relation to one another. The gears 11, 12 are fixed against axial movement relative to the shaft 13 by means, not shown, and are in constant mesh with gears 14 and 16 mounted on a second shaft, not shown. A splined hub 17 is formed on shaft 13 intermediate the gears 11, 12. Axially straight external spur teeth 21, 22 are formed on the gears 11, 12, respectively, adjacent the axially opposite ends of the hub 17. The teeth 21, 22 are spaced from the axial confronting sides 23, 24 of gears 11, 12 by annular grooves 26, 27. A clutch collar 31 presents internal spline teeth 32 in axially shiftable relation to and in torque transmitting engagement with the external spline teeth 33 formed on hub 17. The collar 31 is shiftable axially by a shift yoke 34 to drive establishing or coupling positions in which the abutment surfaces 38, 39 formed on annular flanges 36, 37, respectively, are in engagement with axially confronting sides 23, 24 of gears 11, 12, respectively. In FIG. 5 the collar 31 is illustrated in a coupling position wherein abutment surface 38 is in abutting engagement with side 23 of gear 11 and the collar couples the gear 11 to shaft 13.

Figure 3:
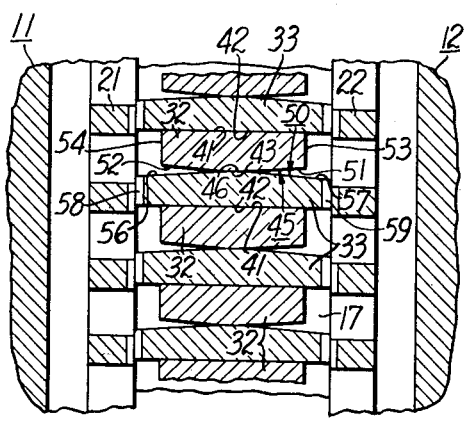
FIG. 3 is a section taken along the lines III—III of FIG. 2.

Referring to FIG. 3, each of the internal spline teeth 32 of collar 31 have a face 41 formed on one of its circumferentially opposite sides. The face 41 is axially straight and parallel to the axis 44 of the shaft 13. The axially opposite face 45 of each of the teeth 41 includes an intermediate portion 43 which is parallel to the axis 44 and camming surfaces 51, 52 tapering toward side 41 from the intermediate portion 43 to the opposite axial ends 53, 54, respectively, of the internal spline teeth. Face 41 of the internal spline teeth is in circumferentially confronting relation to a complementary face 42 formed on one side of each of the hub teeth 33.

Figure 2:
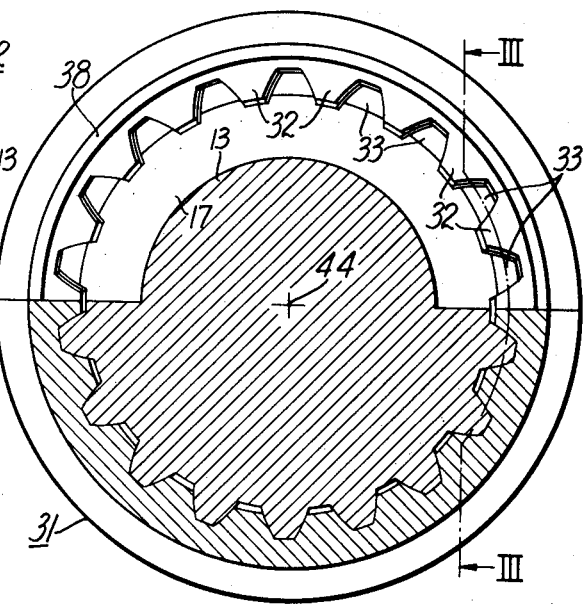
FIG. 2 is an enlarged section taken along the lines II—II of FIG. 1.

Each of the external spline teeth 33 of hub 17 includes a central portion 46 which in the neutral position of the collar as shown in FIGS. 1 and 2 is in circumferentially confronting relation to the intermediate portion 43 of the collar teeth 32. The face 50 on each of the external spline teeth 33 includes camming portions 56, 57 tapering in axially opposite directions from the central portion 46 toward the opposite face 42 of teeth 33 to the opposite axial ends 58, 59 of the latter.

Figure 4:
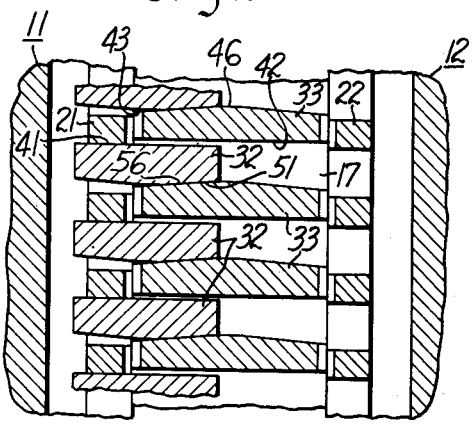
FIG. 4 is a section similar to FIG. 3, but showing the collar in a coupling position.

When the collar is shifted to the left as illustrated in FIG. 5 the internal teeth 32 of collar 31 couple the gear 11 to shaft 13 by virtue of the collar teeth 32 being in splined engagement with the teeth 21 and teeth 33. When the collar is shifted to the coupling position shown in FIG. 5 the internal spline teeth 32 will engage teeth 21 of gear 11 as shown in FIG. 4. The shaft is rotating clockwise as viewed in FIG. 2, thereby imparting a camming action through camming portion 56 and camming surface 51. The camming action is due to the axial component of the thrust transmitted by the teeth 33 to teeth 32. The axially straight faces 41 engage the teeth 21 of gear 11.

In manufacturing, the internal spline teeth 32 of the collar are tapered by placing the collar at an angle so that the shaper will cut deeper toward the axially outer ends of the teeth. The annular flanges 36, 37 are so formed as to not interfere with the shaping of the collar teeth 32. This is accomplished by spacing the flanges 36, 37 radially outwardly from the teeth 32. The hub teeth 33 are tapered by controlling a hobbing cutter with a helix angle guide. Thus it is seen that conventional gear manufacturing equipment may be employed to make the tapered teeth, collar and hub of this invention.

Although a single embodiment of this invention has been illustrated and described, it is not intended to so limit this invention, but rather it is intended to cover all modifications and variations thereof which are embraced by the appended claims.

What is claimed is:
1. A clutch mechanism for a constant mesh transmission having a pair of coaxial gears presenting axially confronting sides, the combination comprising: a shaft rotatably supporting said gears and presenting a hub intermediate said gears, axially straight external spur teeth formed on said gears, respectively, adjacent said hub, external spline teeth formed on said hub, a face formed on one of the circumferentially opposite sides of each of said external spline teeth in parallel relation to the axis of said shaft, a face formed on the other of the circumferentially opposite sides of each of said external spline teeth including a central portion parallel to said axis and camming portions tapering toward said one side from said central portion to opposite axial ends of said external spline teeth, a clutch collar presenting internal spline teeth in axially shiftable relation to and torque transmitting engagement with said external spline teeth formed on said hub, a first face on each of said internal spline teeth in circumferentially engageable relation to said face formed on said one side of each of said external spline teeth on said hub, and a second face formed on each of said internal spline teeth including an intermediate portion parallel to said axis and in circumferentially confronting relation to said central portion on the mating external spline tooth when said collar is in a neutral position, said second face of said internal spline teeth including camming surfaces tapering in axially opposite directions from said intermediate portion toward said first face of said internal spline teeth to opposite axial ends of the latter, said collar being shiftable in opposite axial directions to alternate axially spaced coupling positions to selectively connect said gears to said shaft, said camming portions at one axial side of said central portions of said external spline teeth being in torque transmitting engagement with complementary camming surfaces of said internal spline teeth and said first face on said internal spline teeth being in torque transmitting engagement with said spur teeth on one of said gears when said collar is shifted to one of said positions.

2. The structure set forth in claim 1 and further comprising axially facing abutment surfaces on opposite axial ends of said collar in radially outward spaced relation to said internal spline teeth, one of said abutment surfaces abutting said side of one of said gears when said collar is shifted to said position connecting said one gear to said shaft.

References Cited in the file of this patent
UNITED STATES PATENTS

| | | |
|---|---|---|
| 2,070,140 | Peterson et al. | Feb. 9, 1937 |
| 2,535,388 | Burks et al. | Dec. 26, 1950 |
| 2,931,474 | Zittrell et al. | Apr. 5, 1960 |